United States Patent [19]

Ikeda

[11] Patent Number: 5,001,334

[45] Date of Patent: Mar. 19, 1991

[54] PHOTODETECTOR FOR HOLOGRAM-TYPE OPTICAL HEAD INCLUDING MEANS FOR DETECTING RETURN LIGHT SPOT DEVIATION

[75] Inventor: Tetsuhito Ikeda, Osaka, Japan

[73] Assignee: NEC Home Electronics Ltd.

[21] Appl. No.: 238,138

[22] Filed: Aug. 30, 1988

[30] Foreign Application Priority Data

Nov. 11, 1987 [JP] Japan .................. 62-285062

[51] Int. Cl.$^5$ ............................................... G01J 1/20
[52] U.S. Cl. .................. 250/201.5; 369/44.41
[58] Field of Search ......... 250/201 DF, 204, 201 R, 250/201.5; 369/44-46, 44.41

[56] References Cited

U.S. PATENT DOCUMENTS 4,612,437  9/1986  Ohsato ........................... 369/45
4,614,863  9/1986  Sato ............................... 250/201
4,663,750  5/1987  Hamanaka et al. ............ 369/46
4,695,158  9/1987  Kotaka et al. .................. 250/201

FOREIGN PATENT DOCUMENTS 0238055  9/1987  European Pat. Off. .
0273356  7/1988  European Pat. Off. .

Primary Examiner—David C. Nelms
Assistant Examiner—Stephone B. Allen

[57] ABSTRACT

A photodetector for a hologram-type optical head comprises, as a basic constitution, 6-piece-divided photodiodes. In order to prevent the photodetector from receiving the influence of wavelength variation of a laser diode, that is, spot deviations, one photodiode is divided into two small elements and the spot deviation is detected by utilizing the difference between outputs of the two small elements.

3 Claims, 2 Drawing Sheets

PHOTODETECTOR FOR HOLOGRAM-TYPE OPTICAL HEAD INCLUDING MEANS FOR DETECTING RETURN LIGHT SPOT DEVIATION

BACKGROUND OF THE INVENTION

The present invention relates to a photodetector used for a hologram-type optical head of an optical disk apparatus.

FIG. 3 shows an example of constitution of a hologram-type optical head which performs a double-knife-edge-type focusing control by utilizing a hologram device. As shown in FIG. 4, a conventional photodetector used for this kind of hologram-type optical head comprises 6-piece-divided photodiodes which include 4-piece-divided photodiodes A, B, C and D for focusing control and 2-piece-divided photodiodes E and F for tracking control which are disposed outside the 4-piece-divided photodiodes. As shown in this figure, a focusing error is detected by the 4-piece-divided photodiodes, that is, mere four long and narrow photodiode elements A, B, C and D.

In the hologram-type optical head shown in FIG. 3, a laser light beam emitted from a laser diode 1 is split by a diffraction grating 2 into three light beams, and the split three light beams pass through a hologram 3, are focused by an object lens 4, and form spots on a signal surface of an optical disk 5. Return light beams reflected from the disk 5 return to the hologram 3 along the same paths as the incident paths. The hologram 3 comprises divided two areas which have respective grating patterns different from each other so that each diffracted light beam is focused on two different points on a 6-piece-divided photodetector 6 as shown in FIG. 4. In this case, a focusing error signal (F.E.), a tracking error signal (T.E.), and a reproduced RF signal (R.F.) are expressed as following respective equations:

$F.E. = (A+C) - (B+D)$ $T.E. = E - F$ $R.F. = A + B + C + D$ where A to F represent outputs of the corresponding photodiodes.

By the way, the wavelength of laser light beam emitted from the laser diode varies with temperature. If the wavelength of laser light beam varies, a diffraction angle by the hologram 3 is accordingly varied, whereby the spots of diffracted return light beams on the 6-piece-divided photodetector 6 are shifted in a x-direction in FIG. 4. In order to prevent the photodetector 6 from receiving the influence of the wavelength variation of the laser diode, the photodiode elements A, B, C, D, E and F have long and narrow shapes. In this case, the two spots of each return light beam on the photodetector 6 should be adjusted so as to locate on their design positions (normally, the centers of the 4-piece-divided photodiodes, that is, the positions on lines (a) shown in FIG. 4). However, even if the spot positions of the return light beam are deviated, an output of each photodiode element does not vary. Therefore, it could not be performed to adjust the spot positions of the return light beams to the centers of the photodiode elements.

SUMMARY OF THE INVENTION

The present invention has been made to solve the foregoing problem. Accordingly, an object of the invention is to provide a photodetector for the hologram-type optical head which makes it possible to adjust the spot positions of the return light beams to their design positions.

In the present invention, at least one of plural photodetecting elements constituting a photodetector is divided into two small elements.

With the above constitution, by locating a dividing line of the two small elements at a design position of a corresponding return light spot on the photodetector, the difference between outputs of the two small elements becomes zero when the return light spot comes to its design position and the difference takes a certain value when the return light spot is deviated from its design position. Therefore, it becomes possible to detect the deviation of the return light spots by using the outputs of the small elements.

DETAILED DESCRIPTION OF THE PREFERRED EMBODIMENT

Figure 3:
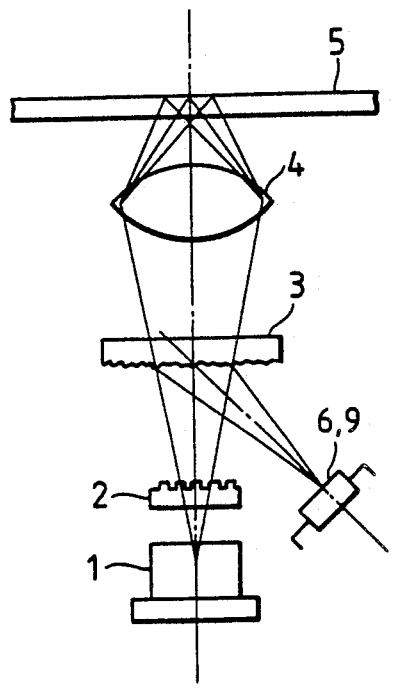
FIG. 3 illustrates a constitution of a hologram-type optical head.
Figure 4:
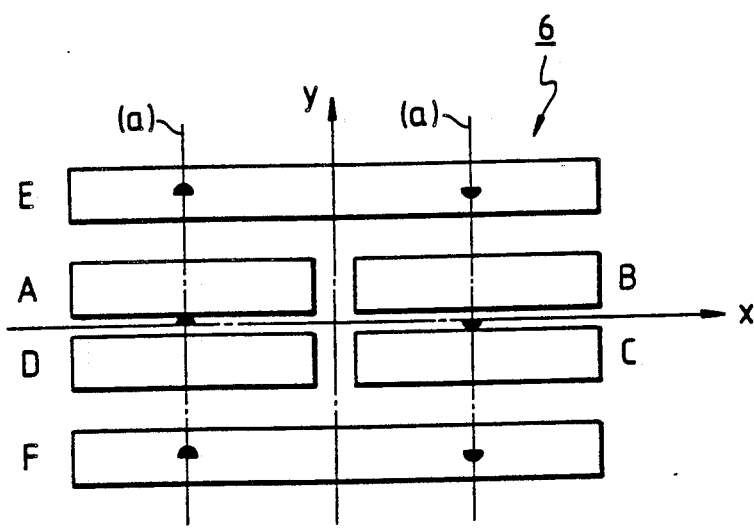
FIG. 4 illustrates a 6-piece-divided photodetector which is employed in the optical head shown in FIG. 3.

An embodiment of the invention will be described with reference to the accompanying drawings. A photodetector of the invention is applied to a hologram-type optical head with such constitution as was described with reference to FIG. 3.

Figure 1:
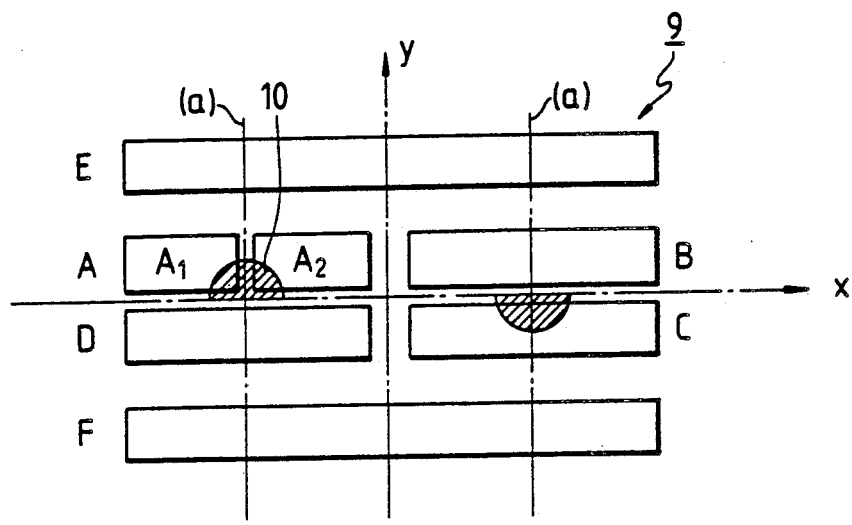
FIG. 1 illustrates a 6-piece-divided photodetector according to an embodiment of the invention.
Figure 2:
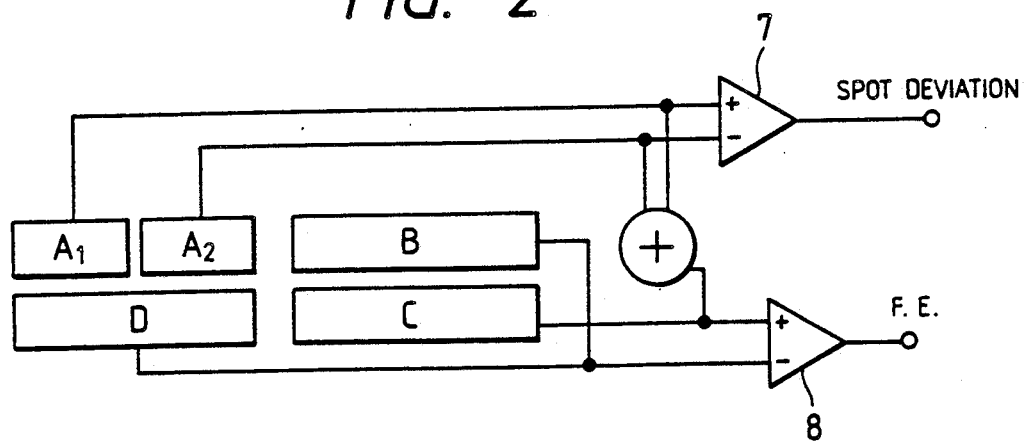
FIG. 2 illustrates a signal detecting circuit according to an embodiment of the invention.

FIG. 1 shows photodetecting elements of a photodetector according to an embodiment of the present invention. As shown in this figure, the photodetector comprises, as a basic constitution, a 6-piece-divided photodetector 9 consisting of 4-piece-divided photodiodes (photodetecting elements) A, B, C and D for focusing and 2-piece-divided photodiodes (photodetecting elements) E and F for tracking, and furthermore, one photodiode element A of the 4-piece-divided photodiodes is divided into two small elements $A_1$ and $A_2$ with the center in the x-direction as a boundary line. The difference between outputs of the small elements $A_1$ and $A_2$ is used to detect a deviation of a return light spot 10 on the photodetector 9. That is, a subtractor 7 (which is part of a detection circuit) for obtaining the difference between the outputs of the two small elements $A_1$ and $A_2$ is provided in a focusing control circuit shown in FIG. 2, and the deviation S of the return light spot 10 is detected as:

$S = A_1 - A_2$ where $A_1$ and $A_2$ represent outputs of the corresponding small elements.

The outputs of the two elements $A_1$ and $A_2$ branch off to be added to each other and then provided to a subtractor 8. Therefore, a focusing error signal (F.E.) is expressed as:

$F.E. = ((A_1 + A_2) + C) - (B + D)$.

In FIG. 1, spots on photodiode elements E and F are omitted.

With the above constitution, in adjusting the spots of the return light beams reflected from a signal surface of an optical disk to their design positions on the photodetector 9, in this case, to the centers in the x-direction of the photodiode elements $A_1$, B, C and D (the positions on line (a) in FIG. 1), when the two spots of the return light beam are deviated from the centers in the x-direction of the photodiode elements A, B, C and D, the spot 10 is deviated from the boundary line between the two small elements $A_1$ and $A_2$ and the difference occurs in the outputs of the two small elements. Therefore, the completion of such adjustment of the return light beam that the outputs Of the two small elements $A_1$ and $A_2$ are made to be zero (that is, $S=A_1-A_2=0$) means that the center of the return light spot 10 has been made coincident with the boundary line between the two small elements $A_1$ and $A_2$. This also means that the return light spots are made coincident with the centers (design positions) in the x-direction of the elements A, B, C and D. In the above-described manner, the deviation of the return light spots on the photodetector 9 can be easily adjusted on the basis of the outputs of the photodiodes.

Although the photodetector of the above embodiment is applied to the three-beam, hologram-type optical head, it is apparent that the present invention can be also applied to an one-beam, hologram-type optical head. Moreover, the photodetector is not limited to the photodiodes, but, for example, phototransistors may be used as the photodetector.

What is claimed is:

1. A photodetector for a beam splitter, hologram-type optical head, comprising:
   a plurality of photodetecting elements for detecting return light beams reflected from an optical disk and then diffracted by a hologram, at least one of said photodetecting elements being divided into two small elements; and
   a signal detecting circuit for detecting a difference between outputs of said two small elements as a spot deviation signal which represents a deviation of a return light spot on said one of said photodetecting elements.

2. A photodetector as claimed in claim 1, wherein said plurality of photodetecting elements comprises 4-piece-divided photodetecting elements for detecting a focusing error and 2-piece-divided photodetecting elements for detecting a tracking error which are disposed outside said 4-piece-divided photodetecting elements, and one of said 4-piece-divided photodetecting elements is divided into said two small elements.

3. A photodetector as claimed in claim 1, wherein said outputs of said small elements branch off to be added to each other to form a focusing error signal.

* * * * *